United States Patent [19]
Lo et al.

[11] Patent Number: 5,959,003
[45] Date of Patent: Sep. 28, 1999

[54] PARTICULATE AQUEOUS POLYURETHANE DISPERSION AND PROCESS FOR PRODUCING THE SAME

[75] Inventors: Huey-Huey Lo, Taoyuan; Yi-Hung Jan, Hsinchu; Huey-Zong Wen, Taoyuan; Wen-Jiunn Chen; Nien-Shi Chang, both of Hsinchu, all of Taiwan

[73] Assignee: Industrial Technology Research Institute, Hsinchu, Taiwan

[21] Appl. No.: 08/914,726

[22] Filed: Aug. 19, 1997

[30] Foreign Application Priority Data

Jun. 21, 1997 [TW] Taiwan ................... 86108690

[51] Int. Cl.$^6$ ............ C08L 75/04; C08L 75/06; C08L 75/08; C08G 18/12
[52] U.S. Cl. ............ 523/201; 524/500; 524/501; 524/591; 524/839; 524/840; 525/902; 528/71
[58] Field of Search ............ 523/201; 525/902; 524/500, 501, 591, 839, 840; 528/71

[56] References Cited

U.S. PATENT DOCUMENTS

| | | | |
|---|---|---|---|
| 4,608,413 | 8/1986 | Nachtkamp et al. ........... | 524/591 |
| 5,011,885 | 4/1991 | Chen et al. ........... | 524/591 |
| 5,500,457 | 3/1996 | Sarkar et al. ........... | 523/201 |
| 5,539,018 | 7/1996 | Lühmann et al. ........... | 523/201 |
| 5,618,859 | 4/1997 | Maeyama et al. ........... | 523/201 |
| 5,624,747 | 4/1997 | Sarkar et al. ........... | 523/201 |

*Primary Examiner*—Rabon Sergent
*Attorney, Agent, or Firm*—Darby & Darby

[57] ABSTRACT

The present invention provides particulate aqueous polyurethane dispersions and a process for producing the same. Two diverse polyols are reacted with two different amount of hydrophilic group-containing dihydric alcohols to obtain a hydrophobic prepolymer and a hydrophilic prepolymer respectively, and the two prepolymers obtained are together dispersed in water. After chain-extending the dispersed prepolymers, core-shell aqueous polyurethane dispersions are produced, wherein the shell is made from the hydrophilic prepolymer and the core is made from the hydrophobic prepolymer. The polyurethane product made from the aqueous polyurethane dispersions of the invention has superior solvent resistance and can be employed in industrial coating or surface treatment of leather or textiles.

22 Claims, No Drawings

PARTICULATE AQUEOUS POLYURETHANE DISPERSION AND PROCESS FOR PRODUCING THE SAME

BACKGROUND OF THE INVENTION

1. Field of the Invention

The present invention relates to aqueous polyurethane (PU) dispersions. More particularly, it relates to particulate aqueous polyurethane dispersions having the core-shell morphology and the process for producing the same.

2. Description of the Related Arts

Polyurethane is one of five widely-used resins and also is one of three highly-functional resins. However, over 90 percent of polyurethanes contain quite a lot of organic solvent such as N,N-dimethylformamide or toluene, which pollutes the environment and endangers the health of operators. Since environment protection is gaining world-wide attention, and pollution laws are becoming stricter, the polyurethane resin industry has made revolutionary progress in recent years by using low-polluting aqueous polyurethane resins instead of high-polluting, solvent type polyurethane resins.

In the early 1960s, many patents with respect to aqueous polyurethanes appeared. In the early stages, the patents with respect to aqueous polyurethane focused mainly on development and research for manufacturing, while in recent years, they have focused mainly on improving the physical properties of polyurethanes, new applications, and improvement of manufacturing process. For example, EP 684286 discloses an aqueous polyurethane dispersion suitable for use in adhesives or surface coating, which will coagulate when being heated. JP 07082333 discloses the use of polyamine as a chain extender to obtain an aqueous polyurethane with superior film heat resistance. JP 07102030 discloses a radiation-curable aqueous polyurethane. However, most of the aqueous polyurethanes disclosed in these patents are still in the experimental stage, and their physical properties such as tensile strength, elongation, abrasion resistance, and solvent resistance have yet to meet commercial requirements.

A conventional process for producing aqueous polyurethane resins includes prepolymerizing a polyol, a hydrophilic group-containing dihydric alcohol, and a diisocyanate in a high-boiling-point organic solvent; neutralizing the prepolymer with a tertiary amine to ionize the hydrophilic group; dispersing the neutralized prepolymer in water; and finally chain-extending the dispersed prepolymer to obtain aqueous polyurethane dispersions.

However, in the conventional process for producing an aqueous polyurethane, part of the terminal isocyanate groups of the prepolymer will be consumed by water upon dispersing and converted into amino groups. Consequently, the isocyanate groups cannot effectively react with a chain extender, a diamine for example, to extend the chains and raise the molecular weight, thereby adversely affecting the physical properties of resulting polyurethanes.

SUMMARY OF THE INVENTION

It is therefore an object of the invention to solve the above-mentioned problems and provide aqueous polyurethane dispersions and a process for producing the same. The polyurethane product made from the aqueous polyurethane dispersions of the invention has superior solvent resistance property and can be employed in industrial coating or surface treatment of leather or textiles.

According to an aspect of the invention, two diverse polyols were reacted with two different amounts of hydrophilic group-containing dihydric alcohols such as 2,2-dimethylolpropionic acid, to obtain a hydrophobic prepolymer and a hydrophilic prepolymer respectively; the two prepolymers were dispersed in water together and a core-shell aqueous polyurethane particle was thus formed due to the different hydrophilicity of the two prepolymers. The shell is made from the hydrophilic prepolymer, which can protect the -NCO groups inside the shell and prevent its consumption by contact with water. Accordingly, chain extending can be effectively performed.

The above object is achieved by providing a process for producing particulate polyurethane dispersions, which includes forming a first prepolymer by reacting a first polyol with a first diisocyanate and a first hydrophilic group-containing dihydric alcohol; forming a second prepolymer by reacting a second polyol with a second diisocyanate and a second hydrophilic group-containing dihydric alcohol, wherein the second polyol is different from the first polyol, and the weight ratio of the first hydrophilic group-containing dihydric alcohol to the first prepolymer is greater than that of the second hydrophilic group-containing dihydric alcohol to the second prepolymer; dispersing the two prepolymers in water; and chain-extending the dispersed prepolymers to obtain a core-shell aqueous polyurethane dispersions, wherein the shell of the polyurethane dispersions is a hydrophilic polyurethane made from the first prepolymer, and the core of the polyurethane dispersion is a hydrophobic polyurethane made from the second prepolymer.

DETAILED DESCRIPTION OF THE INVENTION

According to the invention, the particulate polyurethane dispersions consist essentially of a core of a hydrophobic polyurethane and a shell of a hydrophilic polyurethane; wherein the shell of the hydrophilic polyurethane is made from a first prepolymer prepared from a first polyol, a first diisocyanate, and a first hydrophilic group-containing dihydric alcohol; and the core of the hydrophobic polyurethane is made from a second prepolymer prepared from a second polyol, a second diisocyanate, and a second hydrophilic group-containing dihydric alcohol. The first polyol is different from the second polyol and the weight ratio of the first hydrophilic group-containing dihydric alcohol to the first prepolymer is greater than that of the second hydrophilic group-containing dihydric alcohol to the second prepolymer.

The first hydrophilic group-containing dihydric alcohol contains hydrophilic groups present in an amount of 45–90 meq, preferably 50–80 meq and the second hydrophilic group-containing dihydric alcohol contains hydrophilic groups present in an amount of 0–20 meq, preferably 5–15 meq, based on 100 g of the first prepolymer and the second prepolymer respectively. The weight ratio of the core/shell of the polyurethane dispersion is within the range of about 1/0.5 to 1/4, preferably within the range of about 1/1 to 1/2.

Polyols suitable for use in this invention have a molecular weight between 1000 to 3000, including polyester polyols, polyether polyols, polycarbonate polyols, and polyacetal polyols. Representative examples of suitable polyols include polytetramethylene glycol (PTMEG), poly(butanediol-co-adipate) diol [P(AA/BD)], and polycarbonate diol.

Diisocyanates suitable for use in this invention are aliphatic or cycloaliphatic diisocyanates. Representative examples of these include isophorone diisocyanate (IPDI), 4,4'-dicyclohexylmethane diisocyanate ($H_{12}MDI$), trimethylhexamethylene diisocyanate (TMDI), cyclohexane diisocyanate, and hexamethylene diisocyanate (HDI).

The invention is described in greater detail with reference to the following non-limiting examples.

EXAMPLE 1

In a solution of N-methyl pyrrolidone (NMP), 150 g of polytetramethylene glycol (Mn=2000), 16.52 g of dimethylol propionic acid, and 68.21 g of isophorone diisocyanate were prepolymerized in the presence of 0.25 wt % of a di-n-butyltin dilaurate catalyst (T-12). When the reaction approached theoretical completion, the reaction mixture was cooled to 50° C. and triethylamine (TEA) was added to neutralize the reaction mixture and the first prepolymer was obtained as a result.

In a solution of N-methyl pyrrolidone, 75 g of poly (butanediol-co-adipate) diol, 1.91 g of dimethylol propionic acid, and 17.79 g of isophorone diisocyanate were prepolymerized in the presence of 0.25 wt % of a T-12 catalyst. When the reaction approached theoretical completion, the second prepolymer was cooled to 50° C. and triethylamine was added to neutralize the reaction mixture and the second prepolymer was thus obtained. Subsequently, the first prepolymer and the second prepolymer were together dispersed into deionized water contained in a vessel, followed by addition of ethylene diamine, a chain extender, to chain-extend the dispersed prepolymers. Particulate aqueous polyurethane dispersions were thus obtained.

The aqueous polyurethane dispersions were dried and processed into a polyurethane film, which exhibited superior solvent resistance (1700 times, toluene JIS-L0801).

EXAMPLE 2

The same procedure as in the Example 1 was repeated, except for the substitution of the following ingredients.

|  | Polyol | weight (g) | DMPA | IPDI | TEA |
| --- | --- | --- | --- | --- | --- |
| 1st Prepolymer | PTMEG | 150.0 | 30.52 | 104.18 | 23.00 |
| 2nd Prepolymer | P(AA/BD) | 75.0 | 1.91 | 17.79 | 1.44 |

EXAMPLE 3

The same procedure as in the Example 1 was repeated, except for the substitution of the following ingredients.

|  | Polyol | weight (g) | DMPA | IPDI | TEA |
| --- | --- | --- | --- | --- | --- |
| 1st Prepolymer | PTMEG | 300.0 | 33.04 | 136.42 | 24.90 |
| 2nd Prepolymer | P(AA/BD) | 75.0 | 1.91 | 17.79 | 1.44 |

EXAMPLE 4

The same procedure as in the Example 1 was repeated, except for the substitution of the following ingredients.

|  | Polyol | weight (g) | DMPA | IPDI | TEA |
| --- | --- | --- | --- | --- | --- |
| 1st Prepolymer | PTMEG | 300.0 | 61.04 | 208.36 | 46.00 |
| 2nd Prepolymer | P(AA/BD) | 75.0 | 1.91 | 17.79 | 1.44 |

EXAMPLE 5

The same procedure as in the Example 1 was repeated, except for the substitution of the following ingredients.

|  | Polyol | weight (g) | DMPA | IPDI | TEA |
| --- | --- | --- | --- | --- | --- |
| 1st Prepolymer | PTMEG | 300.0 | 35.71 | 108.46 | 26.92 |
| 2nd Prepolymer | P(AA/BD) | 75.0 | 1.81 | 13.28 | 1.36 |

EXAMPLE 6

The same procedure as in the Example 1 was repeated, except for the substitution of the following ingredients.

|  | Polyol | weight (g) | DMPA | IPDI | TEA |
| --- | --- | --- | --- | --- | --- |
| 1st Prepolymer | PTMEG | 150.0 | 18.76 | 54.23 | 14.14 |
| 2nd Prepolymer | P(AA/BD) | 75.0 | 1.81 | 13.28 | 1.36 |

EXAMPLE 7

The same procedure as in the Example 1 was repeated, except for the substitution of the following ingredients.

|  | Polyol | weight (g) | DMPA | IPDI | TEA |
| --- | --- | --- | --- | --- | --- |
| 1st Prepolymer | C200 | 150.0 | 30.52 | 104.18 | 23.00 |
| 2nd Prepolymer | P(AA/BD) | 75.0 | 1.91 | 17.79 | 1.44 |

C200 represent polycarbonate diol (Bayer Desmophen, Mn = 2000).

EXAMPLE 8

The same procedure as in the Example 1 was repeated, except for the substitution of the following ingredients.

|  | Polyol | weight (g) | DMPA | IPDI | TEA |
| --- | --- | --- | --- | --- | --- |
| 1st Prepolymer | C200 | 300.0 | 61.04 | 208.36 | 46.00 |
| 2nd Prepolymer | P(AA/BD) | 75.0 | 1.91 | 17.79 | 1.44 |

EXAMPLE 9

The same procedure as in the Example 1 was repeated, except for the substitution of the following ingredients.

|  | Polyol | weight (g) | DMPA | IPDI | TEA |
| --- | --- | --- | --- | --- | --- |
| 1st Prepolymer | C200 | 300.0 | 35.71 | 108.46 | 26.92 |
| 2nd Prepolymer | P(AA/BD) | 75.0 | 1.81 | 13.28 | 1.36 |

EXAMPLE 10

The same procedure as in the Example 1 was repeated, except for the substitution of the following ingredients.

|  | Polyol | weight (g) | DMPA | IPDI | TEA |
| --- | --- | --- | --- | --- | --- |
| 1st Prepolymer | C200 | 150.0 | 18.76 | 54.23 | 14.14 |
| 2nd Prepolymer | P(AA/BD) | 75.0 | 1.81 | 13.28 | 1.36 |

What is claimed is:

1. A process for producing particulate aqueous polyurethane dispersions, comprising the steps of:
    (a) forming a first prepolymer by reacting a first polyol with a first diisocyanate and a first hydrophilic group-containing dihydric alcohol;

(b) forming a second prepolymer by reacting a second polyol with a second diisocyanate and a second hydrophilic group-containing dihydric alcohol; wherein the second polyol is different from the first polyol, and wherein the milliequivalents of hydrophilic groups of the first hydrophiuc group-containing dihydric alcohol is present in an amount greater than the milliequivalents of hydrophilic groups of the second hydrophilic group-containing dihydric alcohol based on 100 g of the first prepolymer and the second prepolymer, respectively;

(c) dispersing the first prepolymer and the second prepolymer in water;

(d) chain-extending the dispersed prepolymers to obtain (dispersion of core-shell polyurethane particles;

wherein the shell of the polyurethane particles is a hydrophilic polyurethane made from the first prepolymer, and the core of the polyurethane particles is polyurethane made from the second prepolymer.

2. The process as claimed in claim 1, wherein each of the first polyol and the second polyol, independently is selected from the group consisting of polyester polyols, polyether polyols, polycarbonate polyols, and polyacetal polyols.

3. The process as claimed in claim 1, wherein the first polyol and the second polyol are polytetramethylene glycol and poly(butanediol-co-adipate) diol respectively.

4. The process as claimed in claim 1, wherein the first polyol and the second polyol are polycarbonate diol and poly(butanediol-co-adipate) diol respectively.

5. The process as claimed in claim 1, wherein each of the first polyol and the second polyol, independently has a number-average molecular weight between 1000 and 3000.

6. The process as claimed in claim 1, wherein each of the first diisocyanate and the second diisocyanate, independently is an aliphatic or cycloaliphatic diisocyanate.

7. The process as claimed in claim 1, wherein each of the first diisocyanate and the second diisocyanate, independently is selected from the group consisting of isophorone diisocyanate, 4,4'-dicyclohexylmethane diisocyanate, trimethylhexamethylene diisocyanate, cyclohexane diisocyanate, and hexamethylene diisocyanate.

8. The process as claimed in claim 1, wherein both the first hydrophilic group-containing dihydric alcohol and the second hydrophilic group-containing dihydric alcohol are 2,2-dimethylolpropionic acid.

9. The process as claimed in claim 1, wherein the first hydrophilic group-containing dihydric alcohol comprises hydrophilic groups present in an amount of 50–80 meq and the second hydrophilic group-containing dihydric alcohol comprises hydrophilic groups present in an amount of 5–15 meq, based on 100 g of the first prepolymer and the second prepolymer respectively.

10. The process as claimed in claim 1, wherein the weight ratio of the second polyol to first polyol of the polyurethane dispersions is within the range of about 1/0.5 to 1/4.

11. The process as claimed in claim 10, wherein the weight ratio of the second polyol to first polyol of the polyurethane dispersions is within the range of about 1/1 to 1/2.

12. Particulate aqueous polyurethane dispersions comprising polyurethane particles having a core-shell structure, in which:

the shell of the polyurethane particles is made from a first prepolymer prepared from a first polyol, a first diisocyanate, and a first hydrophilic group-containing dihydric alcohol; and the core of the polyurethane particles is made from a second prepolymer prepared from a second polyol, a second diisocyanate, and a second hydrophilic group-containing dihydric alcohol; and wherein the first polyol is different from the second polyol and the milliequivalents of hydrophilic groups of the first hydrophilic group-containing dihydric alcohol is present in an amount greater than the milliequivalents of hydrophilic groups of the second hydrophilic group containing dihydric alcohol based on 100 g of the first prepolymer and the second prepolymer, respectively.

13. The particulate aqueous polyurethane dispersions as claimed in claim 12, wherein each of the first polyol and the second polyol, independently is selected from the group consisting of polyester polyols, polyether polyols, polycarbonate polyols, and polyacetal polyols.

14. The particulate aqueous polyurethane dispersions as claimed in claim 12, wherein the first polyol and the second polyol are polytetramethylene glycol and poly(butanediol-co-adipate) diol respectively.

15. The particulate aqueous polyurethane dispersions as claimed in claim 12, wherein the first polyol and the second polyol are polycarbonate diol and poly(butanediol-co-adipate) respectively.

16. The particulate aqueous polyurethane dispersions as claimed in claim 12, wherein each of the first polyol and the second polyol, independently has a number-average molecular weight between 1000 and 3000.

17. The particulate aqueous polyurethane dispersions as claimed in claim 12, wherein each of the first diisocyanate and the second diisocyanate, independently is an aliphatic or cycloaliphatic diisocyanate.

18. The particulate aqueous polyurethane dispersions as claimed in claim 13, wherein each of the first diisocyanate and the second diisocyanate, independently is selected from the group consisting of isophorone diisocyanate, 4,4'-dicyclohexylmethane diisocyanate, trimethylhexamethylene diisocyanate, cyclohexane diisocyanate, and hexamethylene diisocyanate.

19. The particulate aqueous polyurethane dispersions as claimed in claim 12, wherein both the first hydrophilic group-containing dihydric alcohol and the second hydrophilic group-containing dihydric alcohol are 2,2-dimethylolpropionic acid.

20. The particulate aqueous polyurethane dispersions as claimed in claim 12, wherein the first hydrophilic group-containing dihydric alcohol comprises hydrophilic groups present in an amount of 50–80 meq and the second hydrophilic group-containing dihydric alcohol comprises hydrophilic groups present in an amount of 5–15 meq, based on 100 g of the first prepolymer and the second prepolymer respectively.

21. The particulate aqueous polyurethane dispersions as claimed in claim 12, wherein the weight ratio of the second polyol to first polyol of the polyurethane dispersions is within the range of about 1/0.5 to 1/4.

22. The particulate aqueous polyurethane dispersions as claimed in claim 21, wherein the weight ratio of the second polyol to first polyol of the polyurethane dispersions is within the range of about 1/1 to 1/2.

* * * * *